(12) United States Patent
Sullivan

(10) Patent No.: X7031
(45) Date of Patent: Apr. 27, 1832

(54) CHIMNEYS, PREVENTING SMOKING, & EXTINGUISHING THEM

(76) Inventor: Jeremiah Sullivan

Jeremiah Sullivan, A citizen of the U. States
Letters Patent.

The Schedule referred to in these Letters Patent and making part of the same containing a description in the words of the said Jeremiah Sullivan himself of his improvement in the mode of preventing chimneys from smoking and extinguishing fire in them.

---

This invention or discovery is to be called The Fire Extinguisher and Chimney Regulator, which possesses the following advantages, to wit; Safety and Utility as a preventive against the progress of fire in chimneys, and extinguishing them imme diately in case they do take fire; by means of moveable slides and plates and other con structions herein after explained. It is also a preventive against smoking chimneys and flues of any description or in any situation. It will also prevent any person from entering the room where it is constructed through the chimney by means of the slides or plates hereafter described, and will effectually prevent smoke or fire from des cending or falling from other flues in the same or adjacent building.

The invention consists, first, of two jambs; 2d of the top plate; 3d the upper back plate; 4th the lower back plate; 5th bottom plate, and; 6th the slide or slides all of which are to be made of wrought or cast iron or any other substance which is capable of resist ing the action of fire.

First, The two jambs are made of wrought or cast iron or any other substance capa ble of resisting the action of fire and to be constructed with any convenient flare in front from the back part of the top plate and running back from the inner edge of the said top plate from their flare parallel to each other to any distance required by the dimensions of the fire place.

Second. The top plate binding the two jambs to keep them firm in their places, by means of clamps or rods and screws or any other convenient manner is placed imme diately under the arch of the chimney and is, like the other parts of this invention, to be constructed, of a size corresponding with the dimensions of the fire place. In this plate are to be grooves (one at each end) in which are to be inserted the up per edges of the flaring parts of the jambs, and also a groove in the inner edge of it to receive the upper edge of the upper back plate, when it comes in contact with the top plate.

Third. The upper back plate is secured at its lower edge, to the jambs by means of two pivots or hinges (one at each end) at the corners formed by the lower edge and the ends in such manner that the top of it may shut close into a groove formed on the inner edge of the top plate, and that it may be moved backward and forward at pleasure, thereby increasing or decreasing the aperture in the throat of the fire place as circumstances may require.

Fourth. The lower back plate is placed below the upper back plate and is secured by pivots or hinges at the centre of the ends, so that it may be turned from a vertical to an angular position at pleasure enabling a person to remove from the bottom plate any thing that may fall down the chimney back of the plates.

Fifth. The bottom plate, slides into a groove in each jamb which grooves are made sloping from the back wall of the chimney to the lower edge of the lower back plate affording a facility in removing any thing may fall down the chimney as above mentioned by turning the lower back plate as aforesaid.

Sixth. The slides. They enter horizontally into the chimney through apertures of proper dimensions made in the front or side of the chimney and can be taken out or put in at pleasure. They may be confined to a frame corresponding to the dimensions of the flue with grooves in the frame to give a facility in moving them, and securing them in their places. They are to be flat and of such size as entirely to stop the flue if necessary, and are to be placed at any necessary distance above the fire place in the chimney.

One or more may be used as circumstances may require, and may be partially or entirely closed or entirely removed at pleasure.

On the front surface of the upper back plate are placed catches for the purpose of keeping the plate in any position that may be required to regulate the draft. Into the notches on these catches props or braces are made to work. These props are secured to the jambs at the lower ends so that the upper ends may be raised or lowered to fit the catches and secure the plate to any desired angle.

Operation. The invention or improvement being thus constructed and the chimney not drawing smoke as may be desired, the aperture commonly termed the throat may be opened or shut to any proper distance to increase or diminish the draft: If this does not effect the purpose, the slides in the flue above may be opened or closed in such manner as to produce the desired result.

In case the chimney shall take fire the upper back plate may be closed to the edge of the top plate and thus by excluding the air from the bottom the fire will be instantaneously extinguished.

The same effect will also be produced by closing the aperture of the flue by the slide below the fire. By closing the upper back plate in like manner and securing it with a hook or in any other manner all ingress into the room through the chimney is prevented.

The slides by altering the current of the wind down the chimney prevent the smoke or fire from coming down.

Chimneys erected in this manner may be cleansed by burning, without danger, as the air by closing the plate and slides may be excluded at pleasure and the fire extinguished at any moment.

For a further illustration of my improvement I refer to the model and drawing thereof deposited in the Patent Office.

In testimony that the above is a true Specification of my said improvement, I have hereto set my hand, this 11th day of April, A.D. 1832.

Witnesses
E. Warner Ruggles
William G. Crandall

Jeremiah Sullivan

Exd. [illegible]

(1125 words)